(12) United States Patent
Qiu et al.

(10) Patent No.: US 11,131,379 B2
(45) Date of Patent: Sep. 28, 2021

(54) TEMPERATURE REGULATING VALVE

(71) Applicant: Zhejiang Sanhua Automotive Components Co., Ltd., Zhejiang (CN)

(72) Inventors: Haoming Qiu, Zhejiang (CN); Xiaodan Lv, Zhejiang (CN); Tao Pan, Zhejiang (CN); Yongjin Luo, Zhejiang (CN)

(73) Assignee: Zhejiang Sanhua Automotive Components Co., Ltd., Hangzhou (CN)

( * ) Notice: Subject to any disclaimer, the term of this patent is extended or adjusted under 35 U.S.C. 154(b) by 506 days.

(21) Appl. No.: 16/087,708

(22) PCT Filed: May 16, 2017

(86) PCT No.: PCT/CN2017/084497
§ 371 (c)(1),
(2) Date: Sep. 24, 2018

(87) PCT Pub. No.: WO2017/206706
PCT Pub. Date: Dec. 7, 2017

(65) Prior Publication Data
US 2020/0300354 A1  Sep. 24, 2020

(30) Foreign Application Priority Data

May 31, 2016 (CN) .......................... 201610373952.7

(51) Int. Cl.
*G05D 23/02* (2006.01)
*F16H 57/04* (2010.01)
(Continued)

(52) U.S. Cl.
CPC ..... *F16H 57/0413* (2013.01); *F16H 57/0435* (2013.01); *G05D 23/02* (2013.01);
(Continued)

(58) Field of Classification Search
CPC .... G05D 23/02; G05D 23/021; G05D 23/022; G05D 23/024; G05D 23/025; G05D 23/12; G05D 23/121; G05D 23/123
See application file for complete search history.

(56) References Cited

U.S. PATENT DOCUMENTS

| 8,141,790 B2 * | 3/2012 | Sheppard | ................ F01P 7/16 236/34.5 |
| 2008/0029246 A1 * | 2/2008 | Fratantonio | ........ G05D 23/1333 165/103 |

(Continued)

FOREIGN PATENT DOCUMENTS

| CN | 2103703 U | 5/1992 |
| CN | 102224367 A | 10/2011 |

(Continued)

OTHER PUBLICATIONS

First Office Action for Chinese Application No. 201610373952.7, dated Mar. 4, 2019.
(Continued)

*Primary Examiner* — Jonathan Bradford
(74) *Attorney, Agent, or Firm* — Wolf, Greenfield & Sacks, P.C.

(57) ABSTRACT

A thermostatic valve, including: a pressure relief ring capable of moving up and down and disposed in a valve body cavity. In normal conditions, the pressure relief ring is abutted against the outer edge of a first valve seat via a spring. An internal channel capable of being opened or closed via up and down movement of the pressure relief ring is further provided in the valve body cavity; when the pressure of a fluid in the thermostatic valve is excessive, the fluid can drive the pressure relief ring to compress the spring, such that the internal channel is in communication
(Continued)

with a third interface to realize simultaneous communication with a first flow channel and a third flow channel.

11 Claims, 3 Drawing Sheets

(51) Int. Cl.
*G05D 23/12* (2006.01)
*F01M 5/00* (2006.01)
*F16H 61/00* (2006.01)
*F16K 1/36* (2006.01)
*F16K 11/044* (2006.01)
*G05D 23/13* (2006.01)

(52) U.S. Cl.
CPC ......... *G05D 23/121* (2013.01); *G05D 23/123* (2013.01); *F01M 5/007* (2013.01); *F16H 2061/0037* (2013.01); *F16K 1/36* (2013.01); *F16K 11/044* (2013.01); *G05D 23/1333* (2013.01)

(56) References Cited

U.S. PATENT DOCUMENTS

| | | |
|---|---|---|
| 2008/0223466 A1 | 9/2008 | Yoshimura et al. |
| 2010/0126594 A1 | 5/2010 | Sheppard |
| 2012/0247582 A1 | 10/2012 | Lamb et al. |
| 2015/0185738 A1 | 7/2015 | Qiu et al. |
| 2015/0204453 A1 | 7/2015 | Qiu et al. |
| 2015/0211395 A1 | 7/2015 | Gooden |

FOREIGN PATENT DOCUMENTS

| | | |
|---|---|---|
| CN | 102322512 A | 1/2012 |
| CN | 102359576 A | 2/2012 |
| CN | 103574264 A | 2/2014 |
| CN | 104344063 A | 2/2015 |
| CN | 104822975 A | 8/2015 |
| CN | 204943001 U | 1/2016 |
| DE | 69810947 T2 | 10/2003 |
| DE | 102009023824 A1 | 12/2010 |
| DE | 102015201001 A1 | 7/2015 |
| JP | S60-121598 U | 8/1985 |
| JP | 2008-052474 A | 3/2008 |
| JP | 2008-223913 A | 9/2008 |
| JP | 2016089634 A | 5/2016 |
| WO | 99/15767 A1 | 4/1999 |
| WO | 2012/085436 A1 | 6/2012 |

OTHER PUBLICATIONS

Office Action for Japanese Application No. 2018-560632, dated Oct. 7, 2019.
Extended European Search Report for European Application No. 17805651.1, dated Dec. 3, 2019.
International Search Report dated Aug. 25, 2017 in connection with International Application No. PCT/CN2017/084497.

* cited by examiner

TEMPERATURE REGULATING VALVE

This Application is a national stage filing under 35 U.S.C. 371 of International Patent Application Serial No. PCT/CN2017/084497, filed May 16, 2017, which claims priority to Chinese Patent Application No. 201610373952.7, filed on May 31, 2016 with the State Intellectual Property Office of People's Republic of China. The entire contents of these applications are incorporated herein by reference in their entirety.

FIELD

The present application relates to the field of fluid control, and in particular to a thermostatic valve.

BACKGROUND

When a vehicle is running, its various components need to be lubricated timely by lubricating oil, to ensure normal operation of the vehicle. If the lubricating oil does not have a good lubricating property, the service life of the vehicle may be affected. The lubricating property of the lubricating oil has a relationship with the temperature of the lubricating oil, and when the temperature of the lubricating oil is excessively high or excessively low, the lubricating property of the lubricating oil may be influenced.

The lubricating oil generally may not have a too high temperature when the vehicle is normally running. In the case that the vehicle is overloaded or is set in a four-wheel drive mode to run in snow or run off-road, the vehicle is running in a state that a hydraulic torque converter slips excessively, which may cause the gearbox oil to have an excessively high temperature, thus losing the lubricating property.

Conventionally, the function of adjusting the temperature of the gearbox oil is mainly achieved by a cooling flow passage constituted by a thermostatic valve and an external cooling device. In the case that the temperature in an oil path of the gearbox rises, a heat sensitive material of a thermal actuator expands due to being heated, and thus a passage for the gearbox oil to directly flow back to the gearbox is closed, and the oil with a high temperature enters into the external cooling device, and is cooled, and then flows back to the external cooling device outside of the gearbox. On the contrary, in the case that temperature of the oil is too low, the heat sensitive material in the thermal element begins to solidify and contract, the push rod is reset, and the passage for the gearbox oil to directly flow back to the gearbox is opened. The oil in the oil path of the gearbox exchanges heat with heat generating elements of the gearbox during flowing process, to control the temperature of the oil within an appropriate range.

However, in the practical application process, in the case that the fluid pressure of the cooling oil is too high due to blockage of the external cooling device and other reasons, the passage for the gearbox oil to directly flow back to the gearbox is blocked as the temperature of the cooling oil constantly increases, such that problems of excessively high fluid pressure and supply shortage of the cooling oil of the gearbox may also be caused.

SUMMARY

In order to avoid that a fluid pressure of cooling oil is too high due to reasons such as a blockage of an external cooling device, the technical solution of the present application is to provide a thermostatic valve, which includes a valve body in which a chamber is provided, and a thermal actuator and a first spring mounted in the chamber. One end of the chamber is open. One end of the thermal actuator abuts against the first spring. The valve body is provided with at least three ports, which include a first port, a second port and a third port. A valve seat assembly is further provided in the chamber, the valve seat assembly includes a first valve seat. The first valve seat is provided with a first valve port extending through the first valve seat. The thermostatic valve opens or closes the first valve port through cooperation between the thermal actuator and the first spring. An outer diameter of the first valve seat is less than an inner diameter of a portion of the chamber corresponding to the first valve seat. An inner passage is formed between an outer wall of the first valve seat and an inner wall of the chamber.

A pressure relief ring and a second spring are further arranged in the chamber. One end of the second spring abuts against the pressure relief ring. The second spring is in a compressed state. The pressure relief ring is provided with a second valve port extending through a bottom of the pressure relief ring. An inner diameter of the second valve port is less than an outer diameter of the first valve seat and greater than an inner diameter of the first valve port.

The thermostatic valve opens and closes the inner passage through the pressure relief ring. When the inner passage is unblocked, the first port is in communication with the third port through the inner passage, and a first flow passage is formed in thermostatic valve. The first flow passage includes the first port, the inner passage and the third port.

The chamber includes a first chamber and a second chamber. The valve seat assembly further includes a connecting column, a spring support seat and a fitting portion. An end of the first spring abuts against the thermal actuator, and the other end of the first spring abuts against the spring support seat. The connecting column connects the first valve seat and the spring support seat. At least a part of the inner wall of the second chamber is provided to with inner threads. At least a part of the outer wall of the fitting portion is provided with outer threads fitting with the inner threads. The valve seat assembly is fitted and fixed through the threads between the fitting portion and the second chamber.

An inner diameter of the first chamber is greater than an inner diameter of the second chamber. The first valve seat is located in the first chamber. An inner passage is formed between the outer wall of the first valve seat and an inner wall of the first chamber. The outer wall surface and the inner wall surface of the connecting column are both smooth circular arc surfaces. A diameter of the circular arc surface of the outer wall surface of the connecting column is less than an outer diameter of the first valve seat. The first valve seat is formed with an outer extension relative to the connecting column. When the inner passage is blocked, the pressure relief ring abuts against the outer extension.

An end of a portion of the spring support seat connecting with the connecting column is further provided with a groove fitting with the first spring. An end of the first spring abuts against a bottom of the groove. The first valve port, the connecting column and the groove are formed through the same process. An inner wall of the first valve port, an inner wall of the connecting column and an inner wall of the groove are connected smoothly.

A through hole is further arranged in the valve seat assembly, and the through hole extends from an end of the spring support seat close to the connecting column to an end of the fitting portion away from the first chamber. The through hole is in communication with the third port. An inner diameter of the through hole is less than an outer diameter of the first spring. The first flow passage further includes the through hole.

The pressure relief ring is provided with a spring accommodating chamber and a spring supporting portion. The pressure relief ring has a bottom and a side wall portion. The first chamber has at least a portion fitting with a stroke of the pressure relief ring. The pressure relief ring is slidably fitted with the portion of the first chamber. An end of the second spring abuts against the spring supporting portion. When the pressure relief ring is away from the first valve seat, the first flow passage is formed in the thermostatic valve.

An inner wall of the second valve port is slidably fitted with an outer wall of the connecting column. An end of the first valve seat away from the connecting column is provided with a mounting portion. The mounting portion is a polygonal structure located at an end of the first valve port, or at least two blind holes, or at least two grooves arranged along the inner wall of the first valve port, or a portion formed by cutting along the outer wall of the first valve seat.

A first sealing portion is provided at an end of the thermal actuator abutting against the first spring. The first sealing portion abuts against an end of the first spring. An outer diameter of the first sealing portion is greater than a maximum distance between any two points on an inner wall of the first valve port. The thermostatic valve opens and closes the first valve port through the first sealing portion. When the first valve port is opened, the first valve seat is away from the first sealing portion, the pressure relief ring abuts against an outer extension of the first valve seat, the inner passage is blocked, and a second flow passage is formed in the thermostatic valve. The second flow passage includes the first port, the first valve port, the through hole and the third port.

An end cap is arranged at the open end of the chamber. At least a part of the end cap extends into the chamber through the open end. The end cap is fixed through a retainer ring.

The end cap includes an end cap body, an end cap connecting column and a second valve seat. The end cap is sealed by providing a sealing ring between the end cap body and the inner wall of the chamber. The second valve seat is clearance-fitted with an inner wall of a portion between the first port and the second port of the chamber. A third valve port is arranged in the second valve seat. The third valve port is fitted with an end of the thermal actuator body. In the case that an end of the thermal actuator body abuts against or engages with the second valve seat, the third valve port is closed. In the case that the end of the thermal actuator body is away from the second valve seat, the third valve port is opened, the first port is in communication with the second port through the third valve port, a third flow passage is formed in the thermostatic valve. The third flow passage includes the first port, the third valve port and the second port.

The thermal actuator further includes a push rod. An accommodating chamber opening toward the chamber is further arranged in the end cap body. In a direction from the accommodating chamber toward the chamber or in an inward direction from the open end of the accommodating chamber, the accommodating chamber is provided with a spring seat and a third spring are arranged successively. The spring seat has a cap-like structure. The spring seat is sleeved on an end of a portion of the push rod extending into the accommodating chamber. The end of the portion of the push rod extending into the accommodating chamber is located in an inner chamber of the spring seat. One end of the third spring abuts against a bottom of the accommodating chamber, and the other end of the third spring abuts against the spring seat. The third spring is in a compressed state. An initial deformation force of the third spring is greater than or equal to an elastic force generated by the first spring when the first valve port is closed.

A pressure relief ring movable under a pressure difference is provided in the valve body chamber. Under normal circumstances, the pressure relief ring abuts against the first valve seat through a spring. In addition, an inner passage is also provided in the chamber, which may be opened or closed through an upward and downward movement of the pressure relief ring. In the case that the fluid pressure in the thermostatic valve is excessively high, the pressure relief ring is pushed by the fluid to compress the spring, such that the inner passage is in communication with the third port, thereby achieving the simultaneous communication of the first flow passage and the third flow passage, thus preventing the damage caused by excessively high fluid pressure in the thermostatic valve.

Figure 1:
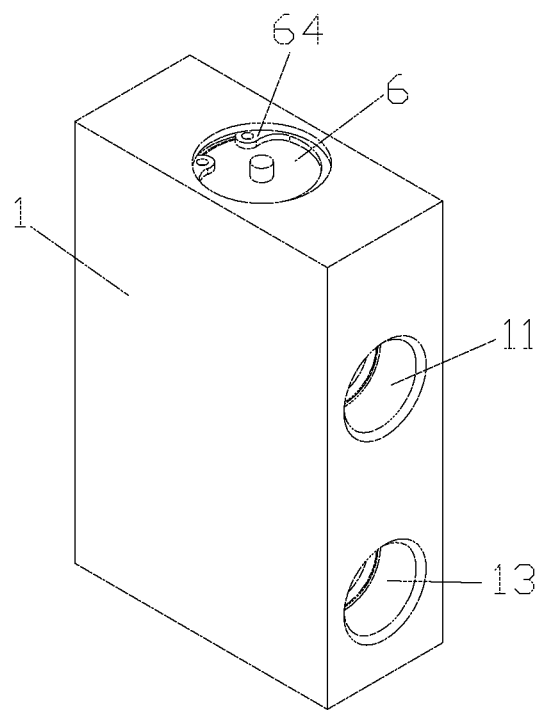
FIG. 1 is a schematic perspective view of a thermostatic valve according to an embodiment of the present application.

Arrows in the figures indicate a flow direction of fluid.

DETAILED DESCRIPTION OF EMBODIMENTS

A thermostatic valve is provided in the technical solution of the present application. A pressure relief ring movable under a pressure difference and a spring restoring force is provided in the chamber of the valve body. An inner passage is also provided in the chamber, which may be opened or closed through an upward and downward movement of the pressure relief ring. Under normal circumstances, the inner passage is closed by the pressure relief ring. In the case that a pressure difference of the two sides of the pressure relief ring is greater than a preset value, the pressure relief ring is pushed by the fluid to compress the spring, such that the inner passage is opened, thereby achieving the simultaneous communication of the first flow passage and the third flow passage, thus preventing a damage caused by excessively high fluid pressure of the system.

An initial deformation force mentioned in this specification refers to a pressure generated by a spring, which is in a compressed state when a product is not used, when the spring is subjected to an external force and tends to deform.

The technical solutions are specifically illustrated in conjunction with the drawings and embodiments, and the locality terms such as "top", "bottom", "left". "right" mentioned in this specification are each set forth according to respective locality relationship in the drawings.

FIG. 1 to FIG. 7 show an embodiment of the present application. The thermostatic valve includes a valve body 1 in which a chamber 15 is provided and a thermal actuator mounted in the chamber 15. One end of the chamber is open. The thermal actuator extends into the chamber 15 through the open end of the chamber 15. The valve body 1 is further provided with a first port 11, a second port 12, a third port 13 and a fourth port 14 which are respectively in communication with outside. The chamber 15 includes a first chamber 151 and a second chamber 152. The first port 11 and the second port 12 are in communication with the first chamber 151 respectively. The third port 153 and the fourth port 154 are respectively in communication with the second chamber 152.

The first port 11 and the second port 12 may be arranged at opposite positions of the valve body. The third port 13 and the fourth port 14 may be arranged at opposite positions of the valve body.

Figure 2:
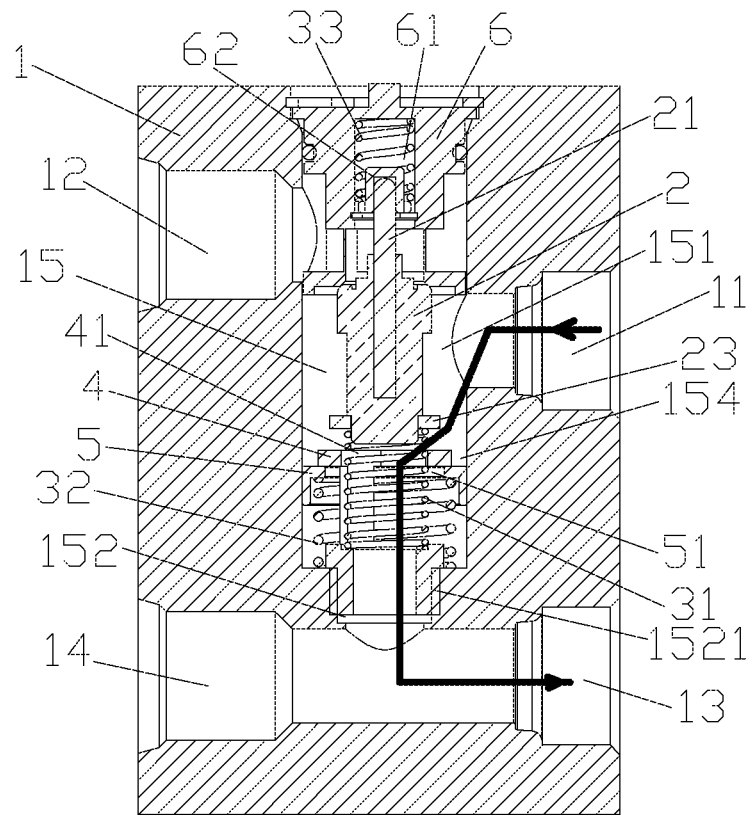
FIG. 2 is a schematic sectional view of the thermostatic valve in FIG. 1 when a second flow passage is unblocked.
Figure 3:
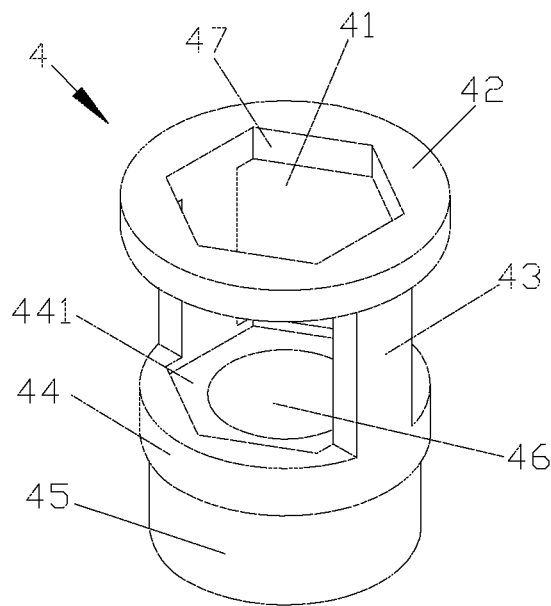
FIG. 3 is a schematic perspective view of a valve seat assembly of the thermostatic valve in FIG. 1.
Figure 4:
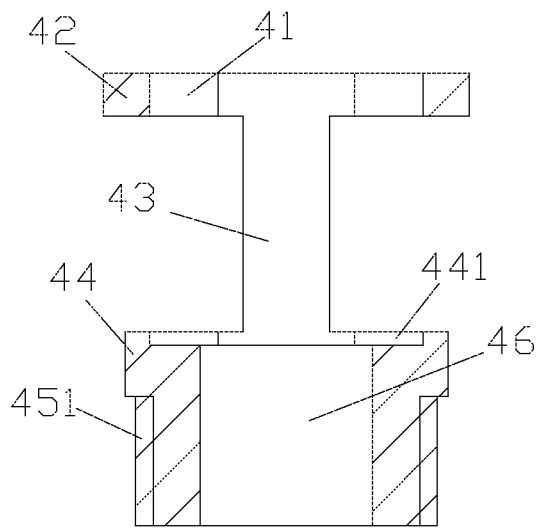
FIG. 4 is a schematic sectional view of the valve seat assembly in FIG. 3.

It is to be noted that the fourth port 14 may not be arranged. The third port 13 is in communication with the second chamber 152. The third port 13 may be arranged opposite to the second chamber 152, or may be arranged in an intersecting manner as shown in FIG. 2. In this embodiment, providing the fourth port is to facilitate the connecting and mounting of pipelines of the thermostatic valve.

The chamber 15 here refers to a chamber formed by a series of drilling holes in a component, i.e., the valve body 1, and parts may be arranged and mounted in the chamber.

The thermal actuator includes a thermal actuator body 22, a push rod 21 and a heat sensitive material filled in the thermal actuator body. The heat sensitive material has a volume changeable with the change of the temperature, and the volume change of the heat sensitive material pushes the push rod 21 to move, and thus can urge the thermal actuator body to move relative to the push rod.

An end cap 6 is mounted at the open end of the chamber 15. At least a part of the end cap 6 passes through the open end to extend into the chamber 15. A space between the end cap 6 and an inner wall of the chamber 15 may be sealed by providing a sealing ring (not shown). The end cap 6 may be fixed by a retainer ring 64.

The end cap 6 includes an end cap body 65, an end cap connecting column 66 and a second valve seat 63. The end cap 6 is sealed by a sealing ring provided between the end cap body 65 and the inner wall of the chamber 15. The second valve seat 63 is in a clearance-fit with an inner wall of a portion of the chamber between the first port 11 and the second port 12. The second valve seat 63 is provided with a third valve port 631. The third valve port 631 is fitted with an end of the thermal actuator body 22. In the case that the end of the thermal actuator body 22 abuts against or press against the second valve seat 63, the thermal actuator body 22 can close the third valve port 631. In the case that the end of the thermal actuator body 22 is away from the second valve seat 63, the third valve port 631 is opened, and the first port 11 may be in communication with the second port 12 through the third valve port 631. At this time, a third flow passage is formed in the thermostatic valve. The third flow passage includes the first port 11, the third valve port 631 and the second port 12.

It is to be noted herein that: 1. a clearance of the clearance-fit is not large, and an oil seal may be formed in the clearance by the lubricating oil when the lubricating oil flows into the thermostatic valve: 2. the second valve seat 63 and the end cap 6 may be arranged separately, and the second valve seat 63 may be arranged in the first chamber through a thread connection, a rivet connection or other manners. In this embodiment, the second valve seat 63 and the end cap 6 are integrally arranged, and the end cap 6 and the second valve seat 63 are connected through the end cap connecting column 66. This arrangement manner is simple in structure and is easy to mount, such that the requirement for internal leakage is easily met.

An accommodating chamber 61 opened toward the chamber 15 is also provided in the end cap body 65. In a direction form the accommodating chamber 61 toward the chamber 15 or in an inward direction from the open end of the accommodating chamber 61, the accommodating chamber 61 is provided with a spring seat 62 and a third spring 33 in sequence. The spring seat 62 has a cap-like structure. The spring seat 62 is sleeved on an end of a top of a portion of the push rod 21 extending into the accommodating chamber 61. The end of the top of the portion of the push rod extending into the accommodating chamber 61 is located in an inner chamber of the spring seat. One end of the third spring 33 abuts against the bottom of the accommodating chamber 61, and the other end of the third spring 33 abuts against an outer extension of the spring seat. At this time, the third spring 33 is in a compressed state. The initial deformation force of the third spring 33 is greater than or equal to an elastic force generated by the first spring 31 when the first valve port 41 is closed.

It is to be noted herein that, the push rod may also directly abut against the third spring 33, for example, the spring seat is integrally formed with the push rod, or the third spring is sleeved on the push rod. Moreover, the third spring and the spring seat may not be provided, and the push rod directly abuts against or presses against the end cap.

The thermal actuator 2 may be mounted into the chamber 15 through the open end of the chamber 15. As shown in the figure, the thermal actuator 2 is located in the first chamber 151. A first sealing portion 23 is further arranged at an end of the thermal actuator 2 away from the end cap 6. The thermal actuator 2 abuts against the first spring 31 arranged in the chamber 15 through the first sealing portion 23.

As shown in the figure, a valve seat assembly 4 and a pressure relief ring 5 are also arranged in the chamber 15. A part of the valve seat assembly 4 is located in the first chamber 151, and the other part of the valve seat assembly 4 is located in the second chamber 152 and is connected with the inner wall of the second chamber 152 through threads.

The valve seat assembly 4 includes a first valve seat 42, a connecting column 43, a spring support seat 44 and a fitting portion 45. The first valve seat 42 is provided with a first valve port 41 extending through the first valve seat 42.

In order to facilitate the mounting of the valve seat assembly 4, at least a portion of the first valve port 41 close to an upper port is a mounting portion 47 of a polygonal structure, such as a hexagon or a pentagon, which can facilitate connecting and fixing, by a tool, the valve seat assembly 4 and the inner wall of the second chamber 152 through threads. It is to be pointed out here that, the valve seat assembly 4 may also be mounted through other structures. For example, the mounting portion 47 is at least two blind holes arranged on an upper end surface of the first valve seat 42, or the mounting portion 47 is at least two grooves opened from the upper end surface of the first valve seat 42 along the inner wall of the first valve port 41. Or, the mounting portion 47 is a portion formed by cutting the upper end surface of the first valve seat 42 along the outer wall of the first valve seat 42.

The first valve seat 42 is located in the first chamber 151. An outer diameter of the first valve seat 42 is smaller than an inner diameter of the first chamber 151. An inner passage 154 is formed between the outer wall of the first valve seat 42 and the inner wall of the first chamber 152. The inner diameter of the first valve port 41 or a diameter of an inscribed circle of the first valve port 41 is greater than an outer diameter of the first spring 31, and the first spring 31 can pass through the first valve port 41 and can be compressed and restored freely. In addition, an outer diameter of the first sealing portion 23 of the thermal actuator 2 is greater than a maximum distance between any two points on the inner wall of the first valve port 41, such that the first sealing portion 23 can fully cover the first valve port. That is, when the first sealing portion 23 abuts against the first valve seat 42, the first valve port 41 is closed. When the first valve seat 42 is away from the first sealing portion 23, the first port 11 may be in communication with the third port 13 through the first valve port 41 and the through hole 46. At this time, a second flow passage is formed in the thermostatic valve. The second flow passage includes the first port 11, the first valve port 41, the through hole 46 and the third port 13.

The first valve seat 42 and the spring support seat 44 are connected by at least two connecting columns 43. An outer wall surface and an inner wall surface of the connecting column 43 may both be smooth circular arc surfaces. An outer diameter of the connecting column 43 is smaller than an outer diameter of the first valve seat 42. A certain space is maintained between the two connecting columns 43.

The spring support seat 44 is used to support the first spring 31. One end of the first spring 31 abuts against the first sealing portion 23, and the other end of the first spring 31 abuts against the spring support seat 44. In order to prevent the first spring 31 from deviating, an end of a portion of the spring support seat 44 connecting with the connecting column 43 may further be provided with a groove 441. The groove 441 is fitted with the first spring to prevent the first spring from deviating. A bottom of the groove 441 abuts against one end of the first spring 31. Further, for ease of processing, the first valve port 41, the connecting column 43 and the groove 441 are formed through the same process. The inner wall of the first valve port 41, the inner wall of the connecting column 43 and an inner wall of the groove 441 are smoothly connected. Or, the inner diameter of the first valve port 41 except the mounting portion, the diameter of the circular arc inner wall surface of the connecting column 43 and the inner diameter of the groove 441 are the same.

The diameter of the circular arc outer wall surface of the connecting column 43 is the same as the outer diameter of the spring support seat 44, and the diameter of the circular arc outer wall surface of the connecting column 43 and the outer diameter of the spring support seat 44 are both smaller than the outer diameter of the first valve seat 42, such that the first valve seat 42 is formed with an outer extension relative to the connecting column 43.

The outer wall of the fitting portion 45 is provided with outer threads, a part of the inner wall of the second chamber 152 is provided with inner threads 1521. The outer threads of the fitting portion 45 are fitted with the inner threads of the second chamber 152, such that the valve seat assembly 4 is mounted in the chamber 15. The inner diameter of the first chamber 151 is greater than the inner diameter of the second chamber 152, such that a shoulder is formed at a connection position of the first chamber 151 and the second chamber 152. The outer diameter of the fitting portion 45 is smaller than or equal to the outer diameter of the spring support seat 44. In this embodiment, the outer diameter of the fitting portion 45 is smaller than the outer diameter of the spring support seat 44. This arrangement facilitates the mounting and positioning of the valve seat assembly 4, and prevents the fitting portion 45 from extending into the second chamber 152 too much.

The valve seat assembly 4 is also provided with a through hole 46. The through hole 46 extends from the bottom of the groove 441 to an end of the fitting portion 45 away from the groove 441. The through hole 46 is in communication with the third port 13, and the inner diameter of the through hole is smaller than the outer diameter of the first spring.

The valve seat assembly is fixedly mounted in the chamber 15 through threads, which can facilitate machining of the chamber, and also facilitate mounting of the valve seat assembly, and reduce costs.

A pressure relief ring 5 is also arranged in the first chamber 151. The outer wall of the pressure relief ring 5 is slidably fitted with the inner wall of the first chamber 151. A second spring 32 is further arranged between the pressure relief ring 5 and the shoulder formed between the first chamber 151 and the second chamber 152. One end of the second spring 32 abuts against the spring supporting portion 53 of the pressure relief ring 5, and the other end abuts against the shoulder formed between the first chamber 151 and the second chamber 152. The second spring 32 is in a compressed state.

Figure 5:
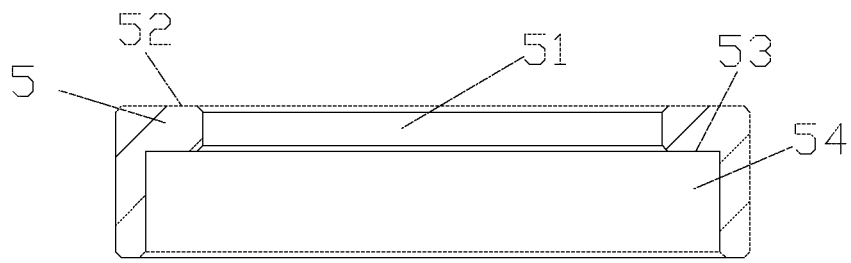
FIG. 5 is a schematic sectional view of a pressure relief ring of the thermostatic valve in FIG. 1.

As shown in FIG. 5, the pressure relief ring 5 has a cylindrical structure with a bottom being cut through. The pressure relief ring 5 includes a bottom (not shown in the figure), a spring accommodating chamber 54 and a side wall portion (not shown in the figure). The bottom of the pressure relief ring 5 includes an upper end 52 toward the first chamber 151 and a spring supporting portion 53 toward the spring accommodating chamber 54. The bottom of the pressure relief ring 5 is also provided with a second valve port 51 extending through the bottom 52. The inner diameter of the spring accommodating chamber 54 is greater than the inner diameter of the second valve port 51, such that the spring supporting portion 53 is formed.

An inner diameter of the second valve port 51 is smaller than the outer diameter of the first valve seat 42 and greater than the inner diameter of the first valve port 41, such that the upper end 52 of the pressure relief ring 5 abuts against a lower end surface of the outer extension of the first valve seat 42 under the action of the second spring 32. In the case that the upper end 52 of the pressure relief ring 5 abuts against the lower end surface of the outer extension of the first valve seat 42, the internal passage 154 is blocked. In the case that the pressure difference between the upper and lower sides of the pressure relief ring is greater than the initial deformation force of the second spring 32, the upper end 52 of the pressure relief ring 5 is away from the lower end surface of the outer extension of the first valve seat 42, and the first port 11 may be in communication with the third port 13 through the inner passage 154, the second valve port 51 and the through hole 46. At this time, a first flow passage is formed in the thermostatic valve. The first flow passage includes the first port 11, the inner passage 154, the second valve port 51, the through hole 46 and the third port.

Further, in order to improve the stability of the pressure relief ring 5, the inner wall of the second valve port 51 is slidably fitted with the outer wall of the connecting column 43. With this arrangement, the problem that the pressure relief ring 5 is tilted to cause jamming of the pressure relief ring 5 can be effectively prevented.

The specific operating mode of the thermostatic valve is described in detail hereinafter. FIG. 2 shows a flow path of the lubricating oil when thermostatic valve is in a normal state. In the state shown in FIG. 2, the first valve port is opened, the second valve port and the third valve port are closed, and the second flow passage is formed in the thermostatic valve. After the lubricating oil flows into the thermostatic valve from the first port, the lubricating oil flows through the first valve port and the through hole, and then flows out of the thermostatic valve from the third port 13. It is to be pointed out herein that, since a flow resistance of the lubricating oil flowing to an oil cooler is greater than a flow resistance of the lubricating oil directly flowing back to the gearbox, the third valve port may not be arranged in the thermostatic valve. In the case of a high requirement for inner leakage, the inner leakage may be effectively reduced by arranging the third valve port.

Figure 6:
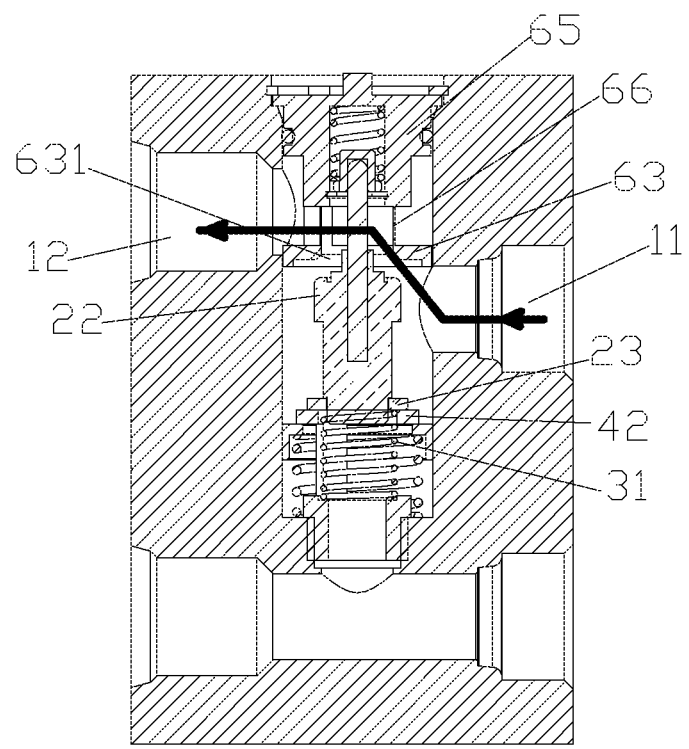
FIG. 6 is a schematic sectional view of the thermostatic valve in FIG. 1 when a third flow passage is unblocked.

FIG. 6 shows the flow path of the lubricating oil in the thermostatic valve when the temperature is relatively high. In the state shown in FIG. 6, the first valve port and the second valve port are closed, the third valve port is opened, and the third flow passage is formed in the thermostatic valve. After the lubricating oil flows into the thermostatic valve from the first port, the lubricating oil flows through the third valve port, and then flows out of the thermostatic valve from the second port 12.

Figure 7:
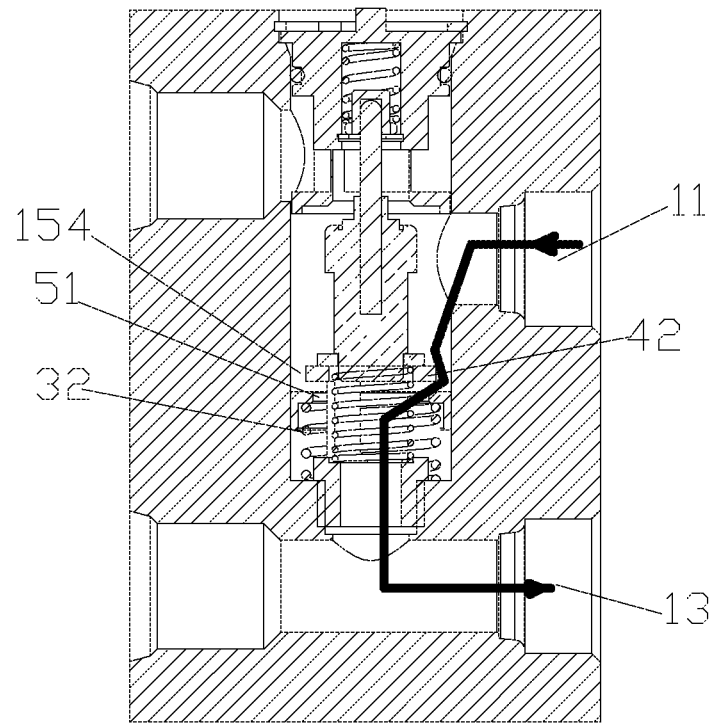
FIG. 7 is a schematic sectional view of the thermostatic valve in FIG. 1 when a first flow passage is unblocked.

FIG. 7 shows the flow path of the lubricating oil when the thermostatic valve is in a fault state, for example, in the case that the oil cooler is blocked. In the state shown in FIG. 7, the first valve port is closed, the second valve port and the third valve port are opened, and the first flow passage is formed in the thermostatic valve. After the lubricating oil flows into the thermostatic valve from the first port, a part of the lubricating oil flows through the third valve port and then flows out of the thermostatic valve from the second port 12, and the other part of the lubricating oil flows through the second valve port and the through hole, and then flows out of the thermostatic valve from the third port 13.

The above description is merely specific embodiments of the present application and is not intended to limit the present application in any form. The locality terms such as "top", "bottom", "left" and "right" appearing in the specification are all described with reference to the accompanying drawings and are not intended to limit the orientation thereof. Although the present application is disclosed with the above preferred embodiments, the above preferred embodiments are not intended to limit the present application. Many variations and modifications may be made to the technical solution of the present application, or equivalent embodiments may be modified from the technical solution of the present application by those skilled in the art based on the methods and the technical contents disclosed above without departing from the scope of the present application. Therefore, any simple changes, equivalent variations and modifications on the above embodiments made according to the technical essence of the present application without departing the content of the technical solutions of the present application fall within the scope of protection of the technical solutions of the present application.

The invention claimed is:

1. A thermostatic valve, comprising a valve body in which a chamber is provided, and a thermal actuator and a first spring mounted in the chamber, wherein
   one end of the chamber is open, one end of the thermal actuator abuts against the first spring, and the valve body is provided with at least three ports which comprise a first port, a second port and a third port, and wherein
   a valve seat assembly is further provided in the chamber, the valve seat assembly comprises a first valve seat, the first valve seat is provided with a first valve port extending through the first valve seat, and the thermostatic valve opens or closes the first valve port through cooperation between the thermal actuator and the first spring, an outer diameter of the first valve seat is less than an inner diameter of a portion of the chamber corresponding to the first valve seat, and an inner passage is formed between an outer wall of the first valve seat and an inner wall of the chamber;
   a pressure relief ring and a second spring are further provided in the chamber, one end of the second spring abuts against the pressure relief ring, the second spring is in a compressed state, the pressure relief ring is provided with a second valve port extending through the pressure relief ring, and an inner diameter of the second valve port is less than an outer diameter of the first valve seat and greater than an inner diameter of the first valve port; and
   the thermostatic valve opens and closes the inner passage with the pressure relief ring, and when the inner passage is unblocked, the first port is in communication with the third port through the inner passage and a first flow passage is formed in the thermostatic valve, wherein the first flow passage comprises the first port, the inner passage and the third port; and wherein
   the chamber comprises a first chamber, the first valve seat is located in the first chamber, and the inner passage is formed between the outer wall of the first valve seat and an inner wall of the first chamber; the valve seat assembly further comprises a connecting column, one end of the connecting column is connected to the first valve seat, the first valve seat is formed with an outer extension relative to the connecting column, and when the inner passage is blocked, the pressure relief ring abuts against the outer extension.

2. The thermostatic valve according to claim 1, wherein the chamber further comprises a second chamber, and the valve seat assembly further comprises a spring support seat and a fitting portion, and wherein
   one end of the first spring abuts against the thermal actuator, and another end of the first spring abuts against the spring support seat, the first valve seat and the spring support seat are connected by the connecting column;
   at least a part of an inner wall of the second chamber is provided with inner threads, and at least a part of an outer wall of the fitting portion is provided with outer threads fitting with the inner threads, the valve seat assembly is fitted and fixed with the second chamber by the inner threads and the outer threads.

3. The thermostatic valve according to claim 2, wherein an inner diameter of the first chamber is greater than an inner diameter of the second chamber, and wherein
   an outer wall surface and an inner wall surface of the connecting column are both smooth circular arc surfaces, a diameter of the circular arc surface of the outer wall surface of the connecting column is less than an outer diameter of the first valve seat.

4. The thermostatic valve according to claim 2, wherein an end of a portion of the spring support seat connecting with the connecting column is further provided with a groove fitting with the first spring, and one end of the first spring abuts against a bottom of the groove.

5. The thermostatic valve according to claim 2, wherein a through hole is further arranged in the valve seat assembly, and the through hole extends from an end of the spring support seat facing the connecting column to an end of the fitting portion opposite to the first chamber, the through hole is in communication with the third port, and an inner diameter of the through hole is smaller than an outer diameter of the first spring, wherein the first flow passage further comprises the through hole.

6. The thermostatic valve according to claim 5, wherein the pressure relief ring is provided with a spring accommodating chamber and a spring supporting portion, and the pressure relief ring is slidably fitted with at least a part of the first chamber; one end of the second spring abuts against the spring supporting portion, and when the pressure relief ring is away from the first valve seat, the first flow passage is formed in the thermostatic valve.

7. The thermostatic valve according to claim 6, wherein an inner wall of the second valve port is slidably fitted with an outer wall of the connecting column, and an end of the first valve seat opposite to the connecting column is provided with a mounting portion, wherein the mounting portion is a polygonal structure located at one end of the first valve port, or is at least two blind holes, or is at least two grooves arranged along the inner wall of the first valve port, or is a portion formed by cutting along the outer wall of the first valve seat.

8. The thermostatic valve according to claim 5, wherein a first sealing portion is provided at one end of the thermal actuator abutting against the first spring, wherein the first sealing portion abuts against one end of the first spring, an outer diameter of the first sealing portion is greater than a maximum distance between any two points on an inner wall of the first valve port, and the thermostatic valve opens and closes the first valve port with the first sealing portion; and when the first valve port is opened, the first valve seat is away from the first sealing portion, the pressure relief ring abuts against the outer extension of the first valve seat, the inner passage is blocked, and a second flow passage is formed in the thermostatic valve, wherein the second flow passage comprises the first port, the first valve port, the through hole and the third port.

9. The thermostatic valve according to claim 8, wherein an end cap is arranged at the open end of the chamber, at least a part of the end cap extends into the chamber through the open end, and the end cap is fixed with a retainer ring;

the end cap comprises an end cap body, an end cap connecting column and a second valve seat, the end cap is sealed by providing a sealing ring between the end cap body and the inner wall of the chamber, and the second valve seat is in a clearance-fit with an inner wall of a portion of the chamber between the first port and the second port;

a third valve port is arranged in the second valve seat, wherein the thermal actuator comprises a thermal actuator body, the third valve port is fitted with an end of the thermal actuator body, when an end of the thermal actuator body abuts against or presses against the second valve seat, the third valve port is closed, and when the end of the thermal actuator body is away from the second valve seat, the third valve port is opened, the first port is in communication with the second port through the third valve port, a third flow passage is formed in the thermostatic valve, wherein the third flow passage comprises the first port, the third valve port and the second port.

10. The thermostatic valve according to claim 9, wherein the thermal actuator further comprises a push rod, an accommodating chamber opened toward the chamber is further arranged in the end cap body, and wherein in a direction from the accommodating chamber toward the chamber or in an inward direction from the open end of the accommodating chamber, the accommodating chamber is provided with a spring seat and a third spring successively, and the spring seat is sleeved on an end of a portion of the push rod extending into the accommodating chamber, wherein the end of the portion of the push rod extending into the accommodating chamber is located in an inner chamber of the spring seat;

one end of the third spring abuts against a bottom of the accommodating chamber, another end of the third spring abuts against the spring seat, and the third spring is in a compressed state, and an initial deformation force of the third spring is greater than or equal to an elastic force of the first spring when the first valve port is closed.

11. The thermostatic valve according to claim 6, wherein a first sealing portion is provided at one end of the thermal actuator abutting against the first spring, wherein the first sealing portion abuts against one end of the first spring, an outer diameter of the first sealing portion is greater than a maximum distance between any two points on an inner wall of the first valve port, and the thermostatic valve opens and closes the first valve port with the first sealing portion; and when the first valve port is opened, the first valve seat is away from the first sealing portion, the pressure relief ring abuts against the outer extension of the first valve seat, the inner passage is blocked, and a second flow passage is formed in the thermostatic valve, wherein the second flow passage comprises the first port, the first valve port, the through hole and the third port.

* * * * *